United States Patent
Chang

(10) Patent No.: US 8,159,253 B2
(45) Date of Patent: Apr. 17, 2012

(54) LIQUID CRYSTAL DISPLAY HAVING COMMON VOLTAGE INITIALIZATION CIRCUIT AND METHOD FOR MANUFACTURING SAME

(75) Inventor: Chien-Jen Chang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 1143 days.

(21) Appl. No.: 11/985,297

(22) Filed: Nov. 13, 2007

(65) Prior Publication Data

US 2008/0111805 A1 May 15, 2008

(30) Foreign Application Priority Data

Nov. 10, 2006 (TW) .............................. 95141766 A

(51) Int. Cl.
G01R 31/26 (2006.01)

(52) U.S. Cl. ................ 324/760.02; 324/760.01; 345/50; 345/87; 349/1; 349/193

(58) Field of Classification Search ............. 324/760.02; 349/193

See application file for complete search history.

(56) References Cited

U.S. PATENT DOCUMENTS

| | | | | |
|---|---|---|---|---|
| 5,293,178 A | * | 3/1994 | Kobayashi | 345/87 |
| 5,734,158 A | * | 3/1998 | Nagashima et al. | 250/225 |
| 5,764,209 A | * | 6/1998 | Hawthorne et al. | 345/87 |
| 5,793,221 A | * | 8/1998 | Aoki | 324/760.01 |
| 5,926,157 A | * | 7/1999 | Moon | 345/89 |
| 6,593,921 B2 | | 7/2003 | Nakanishi et al. | |
| 6,750,926 B2 | * | 6/2004 | Ohgiichi et al. | 349/40 |
| 7,006,070 B2 | | 2/2006 | Ishiyama | |
| 7,212,024 B2 | * | 5/2007 | Iwasaki et | 324/759.03 |
| 7,742,028 B2 | * | 6/2010 | Nitta et al. | 345/88 |
| 2003/0052853 A1 | * | 3/2003 | Wu et al. | 345/90 |
| 2006/0145986 A1 | * | 7/2006 | Oh et al. | 345/92 |
| 2007/0057975 A1 | * | 3/2007 | Oh et al. | 345/690 |

* cited by examiner

*Primary Examiner* — Huy Phan
*Assistant Examiner* — Richard Isla Rodas
(74) *Attorney, Agent, or Firm* — Altis Law Group, Inc.

(57) ABSTRACT

An exemplary method for manufacturing a liquid crystal display (LCD) includes providing an LCD panel (201) including a common voltage initialization circuit (2011); testing and inspecting the LCD panel for defects of the LCD panel, and thereby obtaining a preferred common voltage for the LCD panel; writing parameters of the preferred common voltage to the common voltage initialization circuit; and mounting a driving integrated circuit on the LCD panel, the driving integrated circuit being connected to the common voltage initialization circuit. The driving integrated circuit is connected to the common voltage initialization circuit.

11 Claims, 4 Drawing Sheets

LIQUID CRYSTAL DISPLAY HAVING COMMON VOLTAGE INITIALIZATION CIRCUIT AND METHOD FOR MANUFACTURING SAME

FIELD OF THE INVENTION

The present invention relates to a liquid crystal display (LCD) having a common voltage initialization circuit, and a method for manufacturing such LCD.

CROSS-REFERENCE TO RELATED APPLICATION

This application is related to, and claims the benefit of, a foreign priority application filed in Taiwan as Serial No. 095141766 on Nov. 10, 2006. The related application is incorporated herein by reference.

GENERAL BACKGROUND

A typical LCD has the advantages of portability, low power consumption, and low radiation. LCDs have been widely used in various portable information products such as notebooks, personal digital assistants (PDAs), video cameras and the like. Furthermore, the LCD is considered by many to have the potential to completely replace CRT (cathode ray tube) monitors and televisions.

The LCD usually includes a color filter (CF) substrate, a thin film transistor (TFT) array substrate, and a liquid crystal layer sandwiched between the two substrates. When the LCD works, an electric field is applied to the liquid crystal molecules of the liquid crystal layer. At least some of the liquid crystal molecules change their orientations, whereby the liquid crystal layer provides anisotropic transmittance of light therethrough. Thus the amount of the light penetrating the CF substrate is adjusted by controlling the strength of the electric field. In this way, desired pixel colors are obtained at the CF substrate, and the arrayed combination of the pixel colors provides an image viewed on a display screen of the LCD.

If an electric field continues to be applied to the liquid crystal material in one direction, the liquid crystal material may deteriorate. Therefore, in order to avoid this problem, gradation voltages that are provided to pixel electrodes of the TFT array substrate are switched from a positive value to a negative value with respect to a common voltage. This technique is referred to as an inversion drive method. Normally, the inversion drive method includes a frame inversion, a row inversion, and a column inversion. Because the inversion drive method needs the common voltage to be a predetermined constant value in order to avoid flickers on the screen of the LCD, common voltage parameters are written in a driving integrated circuit of the LCD during manufacturing of the LCD.

Referring to FIG. 5, a typical method of manufacturing an LCD includes the following steps.

In step S110, an LCD panel is manufactured. This step includes providing a thin film transistor substrate and a color filter substrate, combining the thin film transistor substrate with the color filter substrate to form a space therebetween, and filling liquid crystal molecules in the space defined by the two substrates.

In step S120, the LCD panel is tested. This step includes lighting up the LCD panel, and inputting a plurality of test image signals with different gray-scales to the LCD panel for testing the quality of the corresponding images displayed by the LCD panel. The testing is intended to detect whether there are any abnormalities such as line defects or dot defects.

In step S130, at least one driving integrated circuit and a flexible printed circuit board are mounted on the LCD panel. This step includes cutting off a plurality of test lines on the LCD panel used for testing the LCD panel in step S120, and fixing the driving integrated circuit and the flexible printed circuit board on the LCD panel.

In step S140, the LCD panel having the driving integrated circuit and the flexible printed circuit board is inspected to confirm that no breaks or defects exist on the LCD panel after the execution of step S130.

In step S150, a preferred common voltage of the LCD panel is obtained. This step includes detecting the degree of the flicker of the LCD panel, adjusting the common voltage of the LCD panel according to the degree of the flicker in order to depress or eliminate the flicker of the LCD panel, and recording parameters of the preferred common voltage when the flicker of the LCD panel is lowest or absent altogether.

In step S160, the parameters of the preferred common voltage are written into the driving integrated circuit.

Referring to FIG. 6, in step S160, an OTP programmer 100 is used to write the parameters of the preferred common voltage into the driving integrated circuit 102 of the LCD panel 101. The driving integrated circuit 102 includes a common voltage adjusting circuit (not shown), and a one time programmable (OTP) read-only memory (ROM). The OTP programmer 100 includes an image generator 104, a writing voltage generator 105, and a processing controller 106. The image generator 104, the writing voltage generator 105, and the processing controller 106 are electrically connected to the driving integrated circuit 102 via a flexible printed circuit board 103. The image generator 104 is configured to generate flicker test images, and provide the flicker test images to the driving integrated circuit 102 for testing the LCD panel 101. The common voltage adjusting circuit of the driving integrated circuit 102 is configured to confirm the preferred common voltage of the LCD panel 101 as described in step S150, and transmit the parameters of the preferred common voltage to the writing voltage generator 105. The writing voltage generator 105 generates a plurality of voltages according to the parameters of the preferred common voltage. The processing controller 106 is configured to write the voltages representing the parameters of the preferred common voltage to the OTP ROM of the driving integrated circuit 102.

Because the preferred common voltage is confirmed by the driving integrated circuit 102, the method for manufacturing the LCD panel 101 needs the two steps S120 and S150: to light up the LCD panel 101 for testing the quality of the LCD panel 101, and confirm the preferred common voltage, respectively. Every step required adds to the complexity and cost of manufacturing the LCD panel 101. Thus the method for manufacturing the LCD is correspondingly complex and costly.

It is desired to provide a method for manufacturing an LCD panel which can overcome the above-described deficiencies.

SUMMARY

In one preferred embodiment, a method for manufacturing an LCD includes providing an LCD panel including a common voltage initialization circuit; testing and inspecting the LCD panel for defects of the LCD panel, and thereby obtaining a preferred common voltage for the LCD panel; writing parameters of the preferred common voltage to the common voltage initialization circuit; and mounting a driving integrated circuit on the LCD panel, the driving integrated circuit being connected to the common voltage initialization circuit. The driving integrated circuit is connected to the common voltage initialization circuit.

Other novel features and advantages will become more apparent from the following detailed description when taken in conjunction with the accompanying drawings.

DETAILED DESCRIPTION OF PREFERRED EMBODIMENTS

Reference will now be made to the drawings to describe various embodiments of the present invention in detail.

Figure 1:
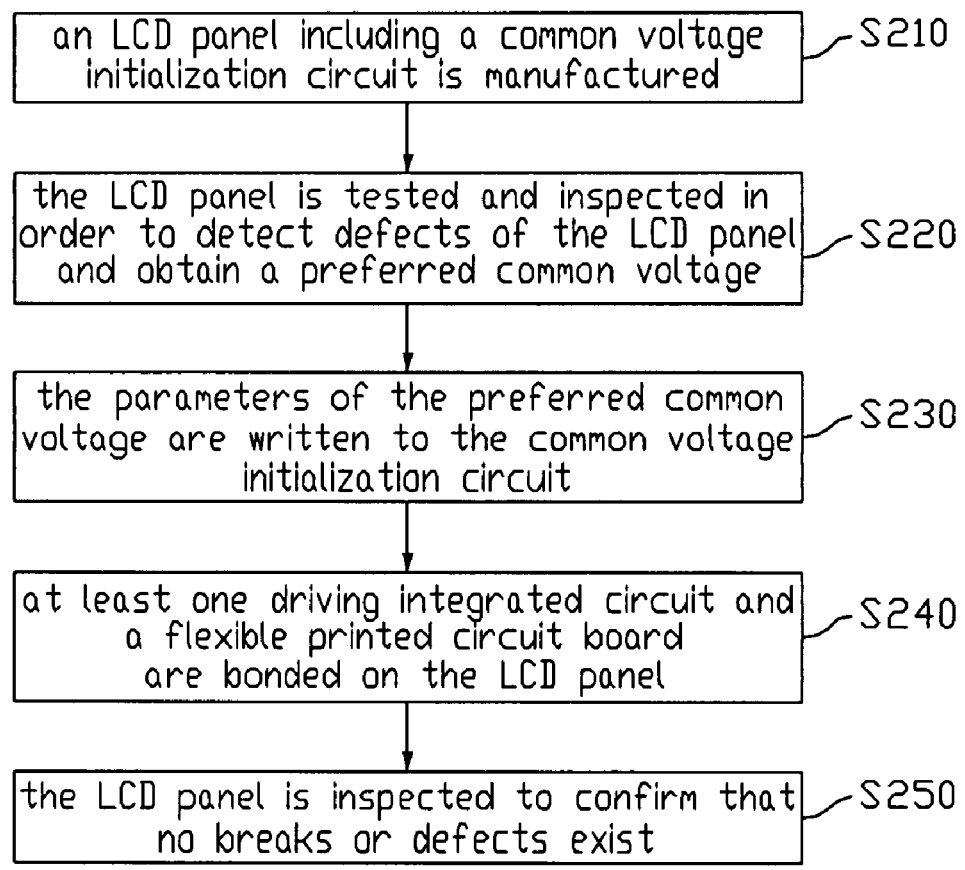
FIG. 1 is a flowchart summarizing a method for manufacturing an LCD according to an exemplary embodiment of the present invention, the method including a process for manufacturing an LCD panel having a common voltage initialization circuit.
Figure 2:
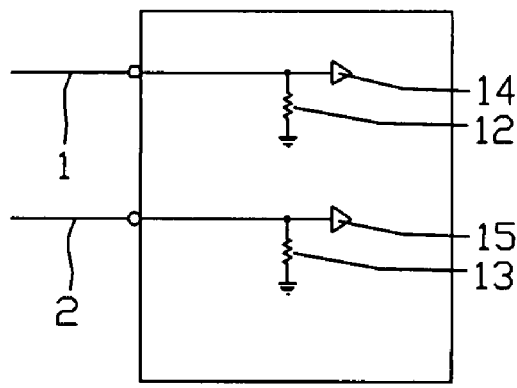
FIG. 2 is a diagram of one kind of common voltage initialization circuit of an LCD panel provided by the method of FIG. 1.

Referring to FIG. 1, a method for manufacturing an LCD according to an exemplary embodiment of the present invention includes the following steps:

In step S210, an LCD panel including a common voltage initialization circuit is manufactured. This step includes providing a thin film transistor substrate and a color filter substrate, combining the thin film transistor substrate with the color filter substrate to form a space therebetween, and filling liquid crystal molecules in the space defined by the two substrates. The LCD panel includes the common voltage initialization circuit formed on the thin film transistor substrate. The common voltage initialization circuit is for recording parameters representing a preferred common voltage. Referring to FIG. 2, the common voltage initialization circuit 2011 includes a first voltage division resistor 12, a second voltage division resistor 13, a first buffer circuit 14, a second buffer circuit 15, a first input terminal 1, and a second input terminal 2. The first input terminal 1 is connected to the first buffer circuit 14 and to ground via the first voltage division resistor 12 to form a first parameter recording branch circuit. The second input terminal 2 is connected to the second buffer circuit 15 and to ground via the second voltage division resistor 13 to form a second parameter recording branch circuit.

In step S220, the LCD panel is tested and inspected in order to detect defects of the LCD panel and obtain a preferred common voltage. This step includes: lighting up the LCD panel; inputting a plurality of test image signals with different gray-scales to the LCD panel for testing the quality of the corresponding images displayed by the LCD panel, such testing intended to detect whether there are any abnormalities such as line defects or dot defects; detecting the degree of the flicker of the LCD panel; adjusting the common voltage of the LCD panel according to the degree of the flicker to depress or eliminate the flicker of the LCD panel; and confirming parameters of a preferred common voltage when the flicker of the LCD panel is lowest or absent altogether.

In step S230, the parameters of the preferred common voltage are written to the common voltage initialization circuit 2011.

In step S240, at least one driving integrated circuit (not shown) and a flexible printed circuit board (not shown) are bonded on the LCD panel. This step typically includes cutting off a plurality of test lines on the LCD panel used for testing the LCD panel in step S220, and hot pressing the driving integrated circuit and the flexible printed circuit board on the LCD panel such that the common voltage initialization circuit is electrically connected to the driving integrated circuit. Thus the parameters of the preferred common voltage stored in the common voltage initialization circuit can be loaded into a memory of the driving integrated circuit. The memory of the driving integrated circuit may be an OTP ROM.

In step S250, the LCD panel having the driving integrated circuit and the flexible printed circuit board is inspected to confirm that no breaks or defects exist on the LCD panel after the execution of step S240.

Figure 3:
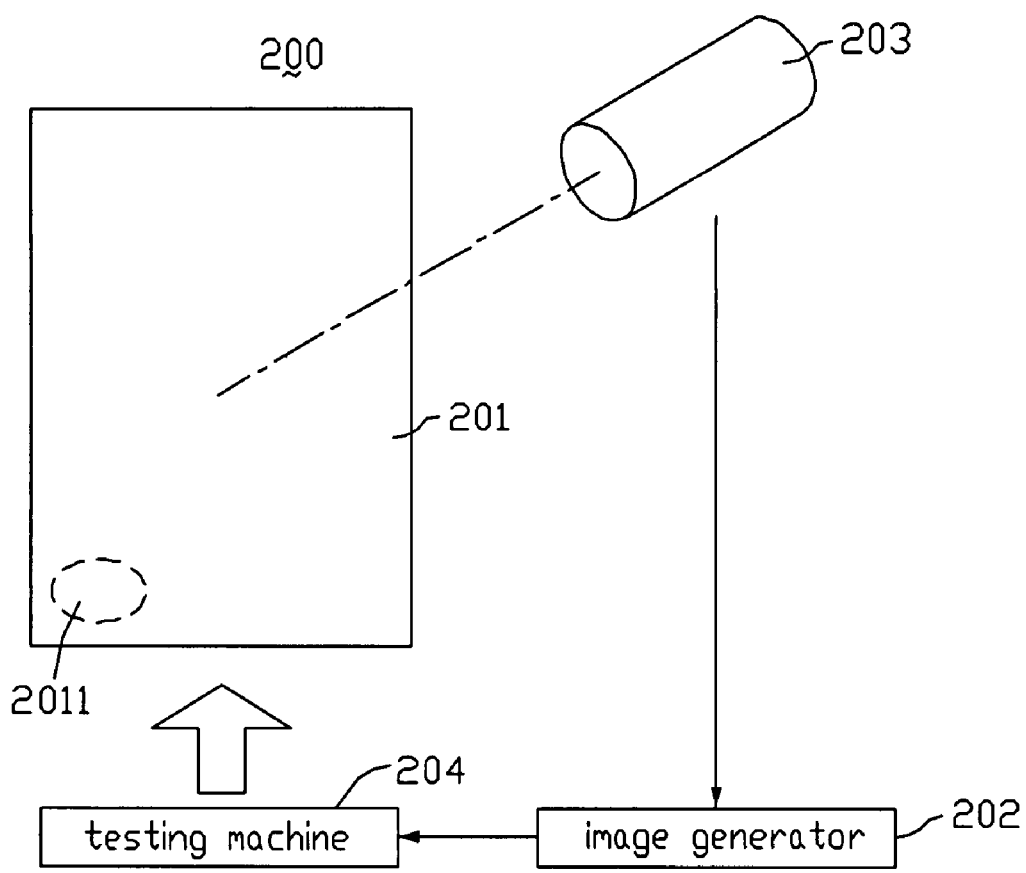
FIG. 3 is essentially a block diagram of a testing device used in the method of FIG. 1, together with the LCD panel provided by the method of FIG. 1.

Referring to FIG. 3, a testing device 200 used in steps S220 and S230 is shown. The testing device 200 is configured for testing an LCD panel 210 having a common voltage initialization circuit 2011. The testing device 200 includes an image generator 202, a sensor 203, and a testing machine 204 having an OTP programmer therein. The sensor 203 is connected to the image generator 202. The image generator 202 is connected to testing machine 204. The testing machine 204 is connected to the LCD panel 201. The image generator 202 generates flicker test image signals, and provides the flicker test image signals to the LCD panel 201 via the testing machine 204. Thus images with different gray-scales are displayed on the LCD panel 201, the LCD panel 201 is inspected for abnormalities such as line defects or dot defects. At the same time, the sensor 203 inspects images displayed on the LCD panel 201, generates a flicker signal according to the degree of the flicker of the LCD panel 201, and provides the flicker signal to the image generator 202. The image generator 202 adjusts the common voltage provided to the LCD panel 201 according to the flicker signal, in order to achieve a preferred common voltage at which the flicker of the LCD panel 201 is lowest or absent altogether. When the preferred common voltage is achieved, the image generator 202 provides a plurality of parameters representing the preferred common voltage to the testing machine 204. The OTP programmer of the testing machine 204 writes the parameters representing the preferred common voltage into the common voltage initialization circuit 2011 of the LCD panel 201.

The operation for writing the parameters to the common voltage initialization circuit 2011 is described in detail as follows. For example, when the testing machine 204 receives digital parameters such as binary data "10", the testing machine 204 provides a high voltage representing the binary data "1" to the first input terminal 1 of the common voltage initialization circuit 2011, and thus the first buffer circuit 14 stores the binary data "1". Furthermore, the testing machine 204 provides a low voltage representing the binary data "0" to the second input terminal 2 of the common voltage initialization circuit 2011, and thus the second buffer circuit 14 stores the binary data "0".

When the driving integrated circuit is mounted on the LCD panel 201, the parameters representing the preferred common voltage can be automatically loaded to the memory of the driving integrated circuit by conventional means.

Because the LCD panel 201 includes the common voltage initialization circuit 2011 configured to record the parameters of the preferred common voltage, in the above-described method, processes such as testing and inspecting the LCD panel for defects and adjusting the common voltage for achieving the preferred common voltage of the LCD panel 201 can be performed in a single step. Thus the overall method is correspondingly simplified.

Figure 4:
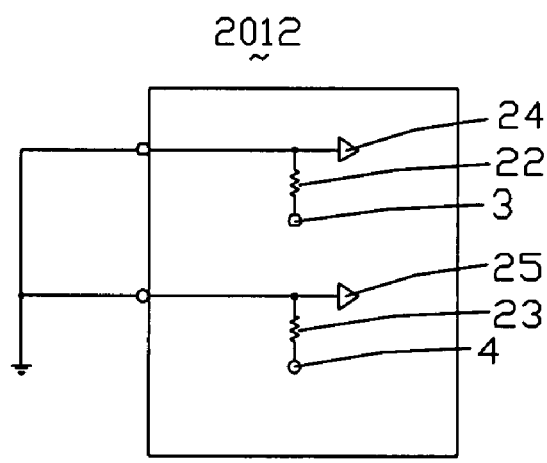
FIG. 4 is diagram of another kind of common voltage initialization circuit of an LCD panel provided by the method of FIG. 1.
Figure 5:
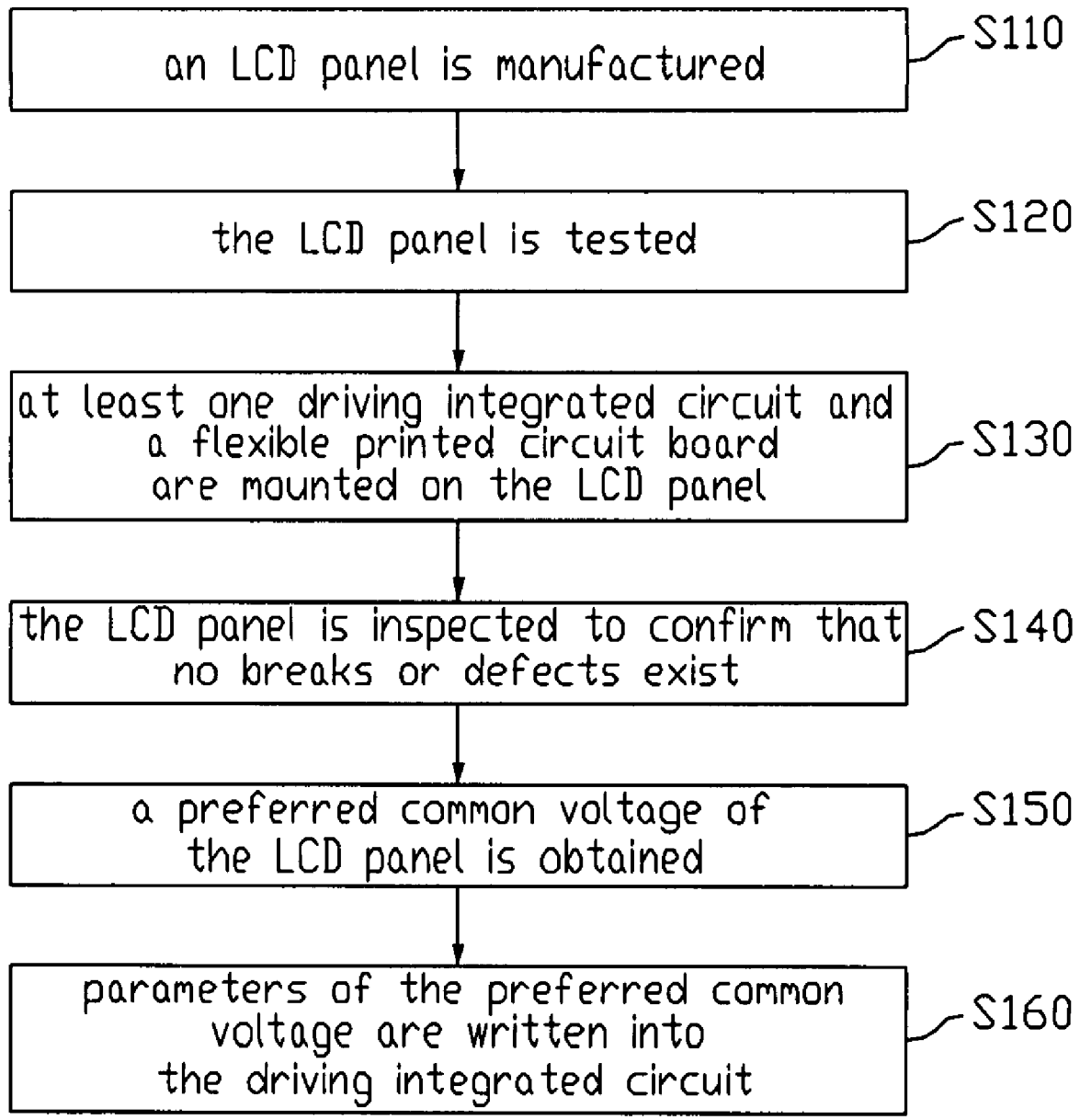
FIG. 5 is a flowchart summarizing a conventional method of manufacturing an LCD.
Figure 6:
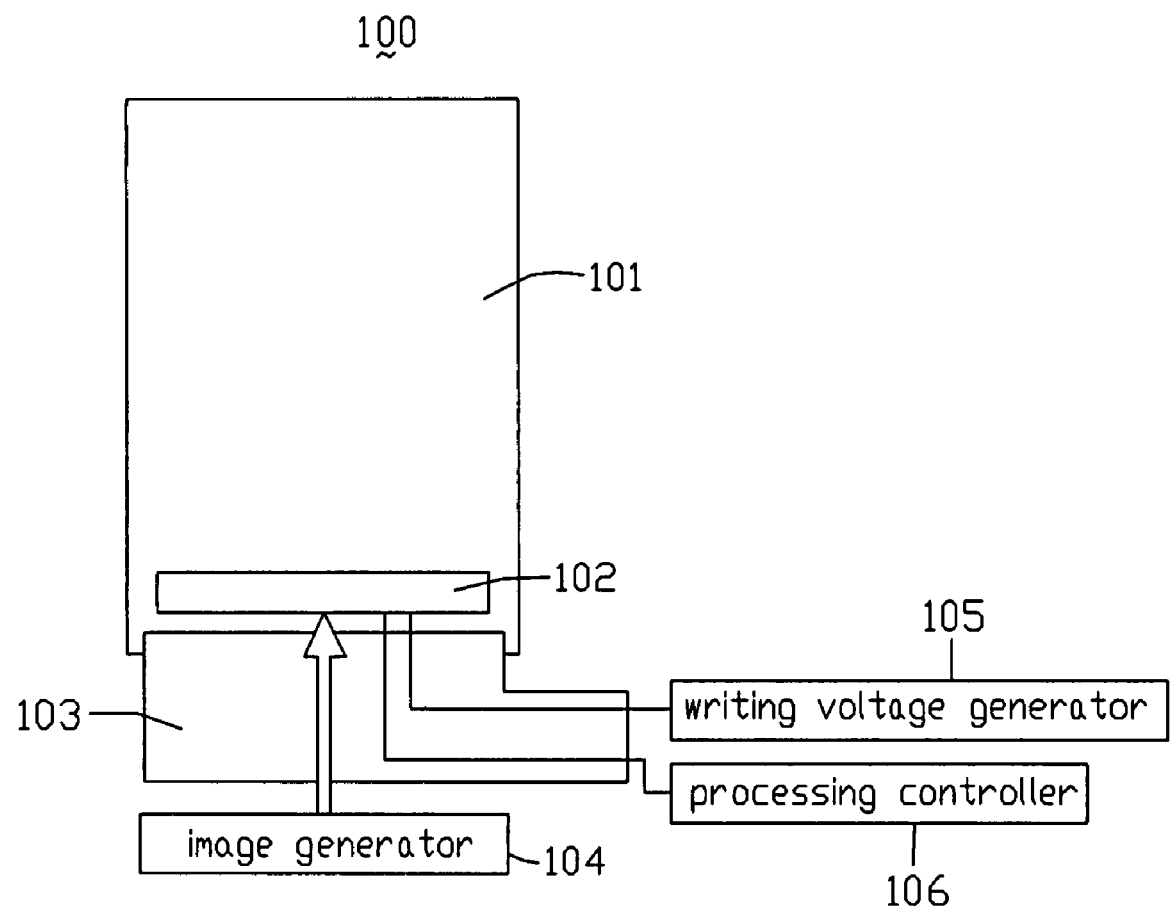
FIG. 6 is a block diagram of an OTP programmer used in the method of FIG. 5, together with an LCD panel provided by the method of FIG. 5.

Referring to FIG. 4, this shows an alternative kind of common voltage initialization circuit 2012, which can be utilized in the LCD panel 201. The common voltage initialization circuit 2012 includes a first voltage division resistor 22, a second voltage division resistor 23, a first buffer circuit 24, a second buffer circuit 25, a first input terminal 3, and a second input terminal 4. The first input terminal 3 is connected to the first buffer circuit 24 and to ground via the first voltage division resistor 22 to form a first parameter recording branch circuit. The second input terminal 4 is connected to the second buffer circuit 25 and to ground via the second voltage division resistor 23 to form a second parameter recording branch circuit. The first and second input terminals 3, 4 are connected to ground. The common voltage initialization circuit 2012 can achieve advantages similar to those described above in relation to the common voltage initialization circuit 2011.

It is to be understood, however, that even though numerous characteristics and advantages of the preferred embodiments have been set out in the foregoing description, together with details of the structures and functions of the embodiments, the disclosure is illustrative only, and that changes may be made in detail, especially in matters of arrangement of parts within the principles of the present invention to the full extent indicated by the broad general meaning of the terms in which the appended claims are expressed.

What is claimed is:

1. A method for manufacturing a liquid crystal display (LCD), the method comprising:
   providing an LCD panel comprising a common voltage initialization circuit;
   testing and inspecting the LCD panel for defects of the LCD panel, and thereby obtaining a preferred common voltage for the LCD panel; and
   mounting a driving integrated circuit on the LCD panel, the driving integrated circuit being connected to the common voltage initialization circuit,
   wherein the process of testing the LCD panel is performed by a testing device comprising an image generator, a sensor, and a testing machine, and the testing and inspecting of the LCD panel comprises:
   generating flicker test image signals by the image generator;
   providing the flicker test image signals to the LCD panel via the testing machine;
   looking for defects of the LCD panel when images with different gray-scales are displayed on the LCD panel;
   inspecting images displayed on the LCD panel and generating a flicker signal according to a degree of flicker of the LCD panel, by the sensor;
   providing the flicker signal to the image generator;
   adjusting the common voltage provided to the LCD panel by the image generator according to the flicker signal in order to achieve the preferred common voltage;
   providing parameters representing the preferred common voltage to the testing machine; and
   writing the parameters to the common voltage initialization circuit of the LCD panel by the testing machine.

2. The method as claimed in claim 1, wherein the preferred common voltage is achieved when the flicker of the LCD panel is lowest.

3. The method as claimed in claim 1, wherein the common voltage initialization circuit comprises a first voltage division resistor, a second voltage division resistor, a first buffer circuit, a second buffer circuit, a first input terminal, and a second input terminal, the first input terminal being connected to the first buffer circuit and to ground via the first voltage division resistor, and the second input terminal being connected to the second buffer circuit and to ground via the second voltage division resistor.

4. The method as claimed in claim 3, wherein writing the parameters of the preferred common voltage to the common voltage initialization circuit comprises providing a high voltage representing a binary data "1" to the first input terminal 1 of the common voltage initialization circuit and providing a low voltage representing a binary data "0" to the second input terminal of the common voltage initialization circuit by the testing machine.

5. The method as claimed in claim 3, wherein the first input terminal and the second input terminal of the common voltage initialization circuit are connected to ground.

6. The method as claimed in claim 1, further comprising attaching a flexible printed circuit board on the LCD panel.

7. The method as claimed in claim 1, further comprising cutting off a plurality of test lines on the LCD panel before mounting the driving integrated circuit on the LCD panel.

8. A method comprising:
   providing an LCD panel comprising a common voltage initialization circuit, and a testing device comprising an image generator, a sensor, and a testing machine;
   generating flicker test image signals by the image generator and providing the flicker test image signals to the LCD panel via the testing machine;
   looking for defects of the LCD panel when images with different gray-scales are displayed on the LCD panel;
   inspecting images displayed on the LCD panel and generating a flicker signal according to a degree of flicker of the LCD panel, by the sensor;
   providing the flicker signal to the image generator and adjusting a common voltage provided to the LCD panel by the image generator according to the flicker signal in order to achieve a preferred common voltage; and
   writing parameters of the preferred common voltage to the common voltage initialization circuit by the testing machine;
   wherein the common voltage initialization circuit comprises a first voltage division resistor, a second voltage division resistor, a first buffer circuit, a second buffer circuit, a first input terminal, and a second input terminal, the first input terminal being connected to the first buffer circuit and to ground via the first voltage division resistor, and the second input terminal being connected to the second buffer circuit and to ground via the second voltage division resistor;
   wherein the writing the parameters of the preferred common voltage to the common voltage initialization circuit by the testing machine comprises:
   providing a high voltage representing a binary data 1 to the first input terminal 1 of the common voltage initialization circuit by the testing machine; and
   providing a low voltage representing a binary data 0 to the second input terminal of the common voltage initialization circuit by the testing machine.

9. The method of claim 8, further comprising:
mounting a driving integrated circuit on the LCD panel, the driving integrated circuit being connected to the common voltage initialization circuit.

10. The method of claim 8, wherein the preferred common voltage is achieved when the flicker of the LCD panel is lowest.

11. The method of claim 8, wherein the first input terminal and the second input terminal of the common voltage initialization circuit are connected to ground.

* * * * *